United States Patent
Reed et al.

(10) Patent No.: US 12,013,411 B2
(45) Date of Patent: Jun. 18, 2024

(54) DEVICE AND METHODS FOR SIMULTANEOUS DETERMINATION OF INTRINSIC VISCOSITY AND NON-NEWTONIAN BEHAVIOR OF POLYMERS

(71) Applicants: YOKOGAWA FLUENCE ANALYTICS, INC., Stafford, TX (US); THE ADMINISTRATORS OF THE TULANE EDUCATIONAL FUND, New Orleans, LA (US)

(72) Inventors: Wayne Frederick Reed, New Orleans, LA (US); Alex Reed, New Orleans, LA (US); Michael Felix Drenski, New Orleans, LA (US)

(73) Assignees: YOKOGAWA FLUENCE ANALYTICS, INC., Stafford, TX (US); THE ADMINISTRATORS OF THE TULANE EDUCATIONAL FUND, New Orleans, LA (US)

( * ) Notice: Subject to any disclaimer, the term of this patent is extended or adjusted under 35 U.S.C. 154(b) by 0 days.

(21) Appl. No.: 16/082,818

(22) PCT Filed: Mar. 7, 2017

(86) PCT No.: PCT/US2017/021200
§ 371 (c)(1),
(2) Date: Sep. 6, 2018

(87) PCT Pub. No.: WO2017/156029
PCT Pub. Date: Sep. 14, 2017

(65) Prior Publication Data
US 2019/0086437 A1  Mar. 21, 2019

Related U.S. Application Data

(60) Provisional application No. 62/304,775, filed on Mar. 7, 2016.

(51) Int. Cl.
*G01N 35/10* (2006.01)
*G01N 11/00* (2006.01)
(Continued)

(52) U.S. Cl.
CPC ......... *G01N 35/1095* (2013.01); *G01N 11/08* (2013.01); *G01N 11/14* (2013.01);
(Continued)

(58) Field of Classification Search
CPC .. G01N 35/1095; G01N 35/085; G01N 11/08; G01N 11/14; G01N 21/31; G01N 2011/0006; G01N 2021/4711
See application file for complete search history.

(56) References Cited

U.S. PATENT DOCUMENTS 2,934,944 A * 5/1960 Eolkin ................... G01N 11/04
73/54.06
3,138,950 A * 6/1964 Welty ..................... G01N 11/08
702/50
(Continued)

FOREIGN PATENT DOCUMENTS

GB  2516217 A  1/2015
JP  S6314141 U  1/1988
(Continued)

OTHER PUBLICATIONS

Wunderlich, Bernhard K., and Andreas R. Bausch. "Differential capillary viscometer for measurement of non-Newtonian fluids." RSC advances 3.44 (2013): 21730-21735. (Year: 2013).*
(Continued)

*Primary Examiner* — Robert J Eom
(74) *Attorney, Agent, or Firm* — Polsinelli PC

(57) ABSTRACT

Devices and methods for rapidly and incrementally or continuously, measuring rheological properties of polymers under different shear rates. The device includes a pump
(Continued)

configured to accept a continuous stream of sample solution during an interval of time, an injector configured to inject a flow of the sample solution through two or more viscometers, and a computing and processing device configured to monitor and measure rheological properties of the solution under at least two shear rates simultaneously in the two or more viscometers.

14 Claims, 7 Drawing Sheets

(51) Int. Cl.
*G01N 11/08* (2006.01)
*G01N 11/14* (2006.01)
*G01N 21/31* (2006.01)
*G01N 21/47* (2006.01)
*G01N 35/08* (2006.01)

(52) U.S. Cl.
CPC ........... *G01N 21/31* (2013.01); *G01N 35/085* (2013.01); *G01N 2011/0006* (2013.01); *G01N 2021/4711* (2013.01)

(56) References Cited

U.S. PATENT DOCUMENTS

| | | | |
|---|---|---|---|
| 4,286,457 A | | 9/1981 | Johnson |
| 4,425,790 A | | 1/1984 | Bice et al. |
| 4,578,990 A | | 4/1986 | Abbott et al. |
| 4,627,271 A | | 12/1986 | Abbott et al. |
| 4,775,943 A | | 10/1988 | Chamberlin et al. |
| 4,793,174 A | * | 12/1988 | Yau ................ G01N 11/08 73/54.04 |
| 4,992,168 A | | 2/1991 | Goto et al. |
| 5,142,899 A | | 9/1992 | Kim et al. |
| 5,573,952 A | | 11/1996 | Moessner |
| 6,072,576 A | | 6/2000 | Long et al. |
| 7,288,229 B2 | | 10/2007 | Turner et al. |
| 7,784,330 B2 | | 8/2010 | Angelescu et al. |
| 9,568,462 B2 | | 2/2017 | Reed |
| 2002/0088953 A1 | * | 7/2002 | Kensey ............ A61B 5/6866 250/577 |
| 2004/0004717 A1 | | 1/2004 | Reed |
| 2006/0090803 A1 | | 5/2006 | Paluncic et al. |
| 2009/0306311 A1 | * | 12/2009 | Reed .................. G01N 21/05 526/59 |
| 2014/0080115 A1 | | 3/2014 | Reed |
| 2015/0168284 A1 | | 6/2015 | Minton et al. |
| 2016/0033470 A1 | | 2/2016 | Reed |

FOREIGN PATENT DOCUMENTS

| | | |
|---|---|---|
| JP | H01227057 A | 9/1989 |
| JP | H03115302 U | 11/1991 |
| JP | H03269237 A | 11/1991 |
| JP | H10504390 A | 4/1998 |
| JP | 2001508354 A | 6/2001 |
| JP | 2002143671 A | 5/2002 |
| JP | 2010-530545 A | 9/2010 |
| JP | 2010530545 A | 9/2010 |
| JP | 2011069754 A | 4/2011 |
| JP | 2011-525967 A | 9/2011 |
| JP | 2011525967 A | 9/2011 |
| JP | 2013539047 A | 10/2013 |
| JP | 2014508294 A | 4/2014 |
| JP | 2015517600 A | 6/2015 |
| JP | 2015522162 A | 8/2015 |
| JP | 6314141 B2 | 4/2018 |

OTHER PUBLICATIONS

International Search Report and Written Opinion dated May 26, 2017 in corresponding International Patent Application No. PCT/US2017/021200, 8 pages.
Supplementary European Search Report dated Oct. 9, 2019 for corresponding PCT Application No. PCT/US2017/021200.
Japanese Office Action dated Mar. 27, 2020 for corresponding JP Application No. 2018-546793.
EP communication pursuant to Article 94(3) dated Feb. 28, 2022.
Japanese Decision of Refusal Application #: 2021-036661; dated Nov. 30, 2022.
Japanese Office Action dated Dec. 4, 2023; application # 2023-053871.
Canadian examiners report; dated Oct. 26, 2023; application # 3,072,447.

* cited by examiner

DEVICE AND METHODS FOR SIMULTANEOUS DETERMINATION OF INTRINSIC VISCOSITY AND NON-NEWTONIAN BEHAVIOR OF POLYMERS

CROSS-REFERENCE TO RELATED APPLICATIONS

This application is a National Stage of International Application No. PCT/US2017/021200, entitled "Device and Methods for Simultaneous Determination of Intrinsic Viscosity and Non-Newtonian Behavior of Polymers," filed on Mar. 7, 2017, which claims the benefit of U.S. Provisional Application No. 62/304,775, entitled "Device and Methods for Simultaneous Determination of Intrinsic Viscosity and Non-Newtonian Behavior of Polymers," filed on Mar. 7, 2016, each of which are incorporated by reference in their entirety, for all purposes, herein.

FIELD OF TECHNOLOGY

The present disclosure is directed to a means of monitoring, characterizing, and controlling rheological properties of polymers during their production. The present disclosure is further directed to devices and methods for simultaneous determination of intrinsic viscosity and non-newtonian behavior of polymers during their production.

BACKGROUND

Polymer intrinsic viscosity and diffusion properties involve time-independent quantities that occur under no externally applied shear conditions (diffusion) and vanishingly small, time-independent shear (intrinsic viscosity). Polymers in melts and in solution constitute complex fluids with intricate time-dependent responses to stresses and flows that reflect molecular motions on many different length and time scales. The two extremes in rheology are: i) the pure, inviscid liquid, which is incapable of supporting any shear stress and immediately flows in response to such stress, and ii) a solid which neither flows nor irreversibly deforms in response to a shear stress. Most real materials exist between these two extremes. Bose-Einstein condensation in helium is a rare exception, where all atoms are phase locked into the ground state, similar to superconductivity, and have no viscosity while in a superfluid state.

The Deborah number (De), is a dimensionless parameter representing the ratio of the time of relaxation of a material in response to a shear stress to the time of experiment or observation. For instance, De equals 0 for the extreme rheological state of inviscid matter (e.g. superfluid Helium) while De approaches infinity for a pure solid.

Polymer motions, such as bond rotations among different configurations, reptations through space, and intermolecular overlap interactions, may lead to viscoelastic responses in polymer solutions that can span many orders of magnitude in time, or in its conjugate variable, the frequency at which stress is applied. Liquids whose viscosity does not change with frequency of stress are termed 'Newtonian' fluids. Most polymeric fluids deviate from Newtonian behavior under certain conditions, and are termed 'non-Newtonian.'

Shear thinning (thixotropy) is one of the most common manifestations of non-Newtonian behavior in polymeric liquids. Increased shear can lead to partial alignment of polymers or colloid particles with the flow, thus decreasing viscosity. Examples include latex paint, blood, and syrups. Shear thickening is the opposite phenomenon (anti-thixotropy) whereby the material becomes more viscous or stiffer with increasing shear, often due to shear-induced organization, such as partial crystallization. Quicksand and aqueous solutions of corn starch are examples of shear-thickening materials.

In practical terms, polymer rheology, and especially its non-Newtonian aspects, are of critical importance in processing polymers. The relationship of applied stress and polymer flow determines the processability of polymers in applications such as extrusion, fiber spinning, and film blowing. Therefore, devices and methods for measuring rheological properties of polymers under different shear rates are desirable. Additionally, devices and methods of monitoring, characterizing, and controlling rheological properties of polymers during their production are desirable. Further, devices and methods for simultaneous determination of intrinsic viscosity and non-newtonian behavior of polymers during their production are desirable.

BRIEF DESCRIPTION OF THE DRAWINGS

Embodiments of the present application are described, by way of example only, with reference to the attached Figures, wherein.

Figure 1:
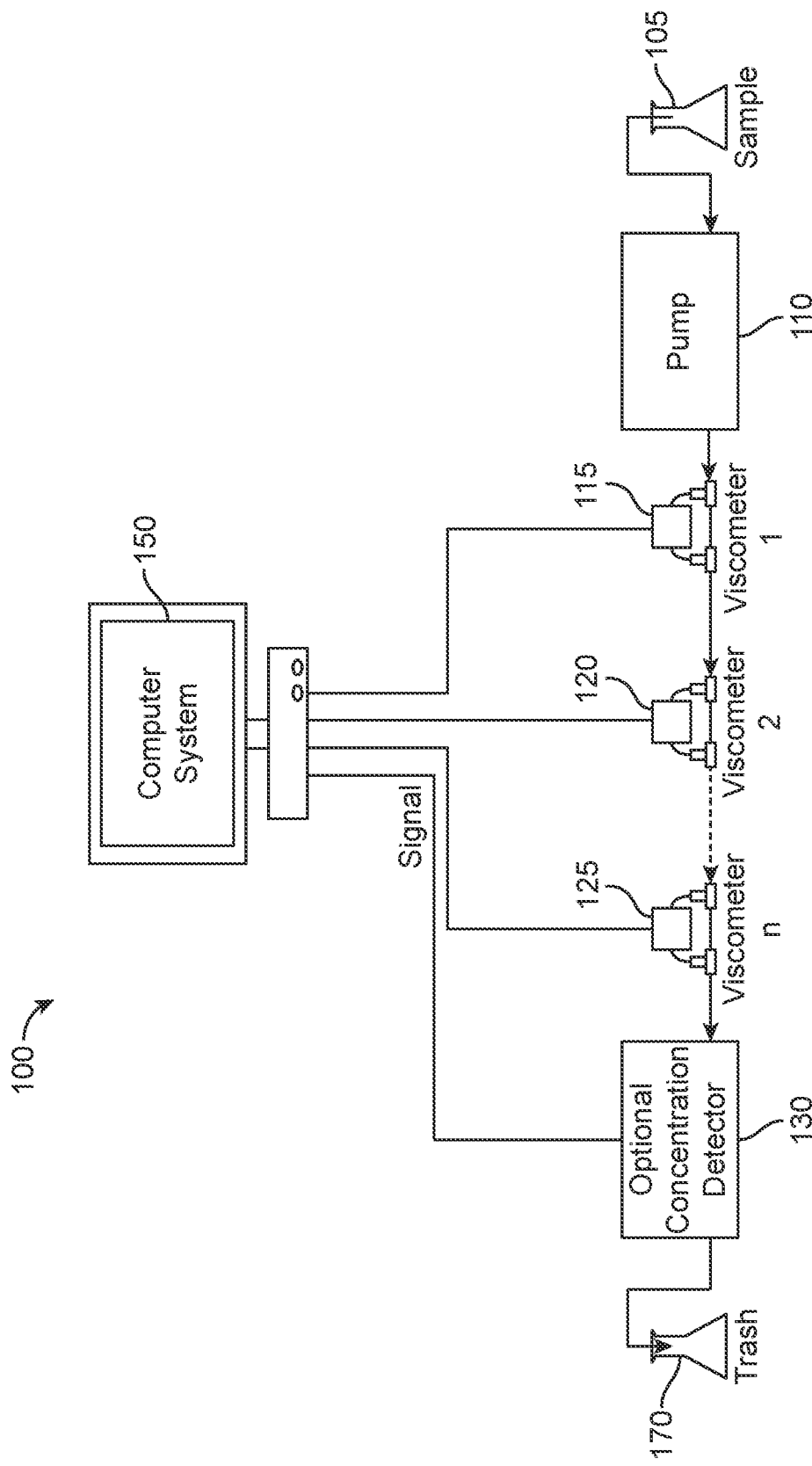
FIG. 1 is an illustration depicting a device for rapidly and incrementally or continuously measuring rheological properties of polymer samples, according to an example embodiment of the present disclosure.

It should be understood that the various aspects are not limited to the arrangements and instrumentality shown in the drawings.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connections can be such that the objects are permanently connected or releasably connected. The terms "comprising," "including" and "having" are used interchangeably in this disclosure. The terms "comprising," "including" and "having" mean to include, but are not necessarily limited to, the things so described.

The term "continuous," with respect to a "continuous measurement" or a sample's ability to be "continuously" measured, refers to a measurement in which no cycle of operations is required between successive measurements, and one in which there is no requirement of a time interval lapse to obtain a successive measurement. The term "continuous," as used herein, does not require an unbroken record of measurements, instead, measurements can be made as often or as seldom as desired as long as no intervening operations are required or performed. For example, during performance of the presently disclosed methods and techniques, a "continuous system" could make measurements thousands of times per second, or just a few times per second, or with seconds or minutes intervening between measurements.

The present disclosure provides devices and methods for rapidly and incrementally or continuously, measuring rheological properties of polymers under different shear rates ($\dot{\gamma}$) Normally, rheological properties are measured on samples of polymers, production end products, or reaction aliquots. These measurements are often carried out in a laboratory. While this can yield detailed, important profiles of the polymer rheology, such measurements are often labor intensive and time consuming. If the goal of the rheological measurements is to monitor and control rheological properties during the production of the polymers then approaches such as merely measuring polymerization end products or a number of individual aliquots of a polymerization process are much too slow, imprecise and cumbersome to be effective.

The devices and methods of the present disclosure provide a means of rapidly determining rheological behavior of polymers during their production. In at least some instances, the devices and methods of the present disclosure may be used in an 'online' production environment. The devices and methods may be used with no relationship to polymer production, e.g. in a laboratory, or in conjunction with any polymer samples that might be provided.

An important means of assessing the rheological behavior of polymer melts and concentrated solutions is the use of dynamic mechanical analysis. This consists of testing the mechanical response, or strain, of a polymeric material to a time-dependent stress or, conversely, measuring the stresses generated by time-dependent strains. For simplicity, a sinusoidal driving function is normally used. In the case of controlled shear stress γ(t), $$\gamma(t) = \gamma_o \sin(\omega t) \text{(controlled input)} \quad (1)$$

$$\frac{\sigma(t)}{\gamma_o} = G'(\omega, T)\sin(\omega t) + G''(\omega, t)\cos(\omega t) \text{ (response function)}$$

The coefficient of the in-phase portion, often termed the dynamic storage modulus, G'(ω,T), measures the purely elastic response of the material, and is normally very sensitive to both frequency (ω) and temperature (T). The out-of-phase portion, termed the dynamic loss modulus, G", measures the energy dissipative response of the material. The phase shift between the input frequency and the response is usually denoted by δ and is the ratio of the moduli:

$$\tan\delta = \frac{G''}{G'} \quad (2)$$

A purely viscous material with no elasticity would have δ=π/2, whereas a loss-free elastic material would have δ=0. A typical polymer will show a complex interplay between how G' and G" behave vs. ω. It is common for G' and G" to intersect once or more as ω increases.

Because polymer rheology is a deeply complex field there are many other methods that may be used to assess different types of viscoelastic and mechanical behavior of polymers in concentrated solutions, melts, and rubbery states. For instance, Mooney-viscosity, is a measure of the torque generated on a spindle rotating at constant angular velocity, immersed in a polymeric material between heated dies. It is one of the most widely used industrial measures of bulk viscoelastic properties of polymeric materials, especially elastomers and rubbers. Often, the Mooney-viscosity may be of greater practical significance than the dynamic mechanical determination of G' and G". The notion of Mooney viscosity is well-grounded in the principles of continuum mechanics but involves the empirically determined Mooney-viscosity and related parameters.

Another exemplary test for assessing the viscoelastic and mechanical behavior or polymers is the Melt-flow index. The Melt-flow index essentially consists of measuring the amount of polymer melt flowing through a tube of specific dimensions under a specific pressure over a specified amount of time. Experimentally, the apparatus is generally a small extruder. An index calculated from the obtained data has a sort of inverse relationship to viscosity at any given temperature, and is indirectly related to polymer molecular weight.

According to at least one aspect of the present disclosure, the presently disclosed devices and methods may use two or more capillary viscometers in a series to form a capillary train. Each capillary may present a different average shear rate to a liquid, flowing therethrough, so that a partial map of solution viscosity versus average shear rate, (η) vs. <$\dot{\gamma}$>, is obtained. The capillaries may include a low shear capillary for determining reduced viscosity of the polymer, $\eta_r$, from which intrinsic viscosity, [η], can be determined or estimated. The capillary train can optionally include one or more back pressure regulators or other devices to at least promote accurate measurements and avoid discontinuities in data.

The pressure drop across a capillary having a length, L, and a radius, R, when a fluid exhibiting a viscosity, flows through it at flow rate, Q, is given by Poisseuille's equation:

$$\Delta P = \frac{8\eta L Q}{\pi R^4}. \tag{3}$$

The average shear rate in parabolic capillary flow is:

$$\langle \dot{\gamma} \rangle = \frac{8Q}{3\pi R^3}. \tag{4}$$

The total fluid viscosity for a pure fluid of viscosity $\eta_o$ to which a polymer of intrinsic viscosity $[\eta]$ and concentration $C_p$ is added is given by:

$$\eta = \eta_0 (1 + [\eta]C_p + k_H([\eta]C_p)^2 + \ldots), \tag{5}$$

measured directly by measuring the pressure drop $\Delta P$ with a differential pressure transducer across the capillary of known L and R, and given Q. $[\eta]$ is the polymer intrinsic viscosity (IV) which is the value approached by reduced viscosity in the limit as polymer concentration goes to zero. The reduced viscosity $\eta_r$ (or RV) is determined from the measured $\eta$ by:

$$\eta_r = \frac{\eta - \eta_0}{\eta_0 c} = \frac{V - V_0}{V_0 c}, \tag{6}$$

where V is the voltage or other signal (e.g. pressure itself) from the pressure transducer and c is the concentration of polymer, either known or measured. It is noted that L, R, $\Delta P$ and Q are absent in Eqn. 6, meaning that the pressure transducer-based viscometer needs no calibration to an absolute value of $\Delta P$, as long as its response is linear. From Eqn. 5, it can be seen that the reduced viscosity is related to IV by:

$$\eta_r = [\eta] + k_{11}[\eta]^2 c. \tag{7}$$

The units of $\eta_r$ and $[\eta]$ in the CGS system are cm$^3$/g, $C_p$ is in g/cm$^3$, and $\eta$ is in Poise.

In at least some instances, the presently disclosed devices and methods provide for determining $\eta_r$ vs. $\langle \dot{\gamma} \rangle$ using multiple viscometers in a fluid flow path. From this certain rheological information is obtained. The degree of non-Newtonian behavior of polymer solutions, such as shear thinning, is related to factors such as polymer molecular weight, polymer concentration in solution, branching, cross-linking, hydrodynamic friction, and other morphological features, such as star and dendrimer structures, and aggregation. An interesting feature of this approach is that if RV vs. $\langle \dot{\gamma} \rangle$ is made a dimensionless quantity simply by dividing by IV, i.e. RV/IV vs. $\langle \dot{\gamma} \rangle$, the concentration cancels out.

As shown in Eqn. 6, the polymer concentration, $C_p$, is required to determine $\eta_{rk}$. $C_p$ may be known, such as in a laboratory experiment where a solution of known $C_p$ is prepared, or in a reactor where $C_p$ is monitored. In the case where $C_p$ is unknown, it needs to be measured. According to at least one aspect of the present disclosure, $C_p$ may be measured using a concentration detector that may be included in the presently disclosed devices and methods. Types of concentration detectors and means for including them in the presently disclosed devices and methods are discussed below.

When considering the ratio RV/IV, it may be seen that concentration cancels out which provides some flexibility in the case where the polymer solution concentration is not well known. It is expected, however, that RV/IV will be a strong function of $C_p$, even though the quantity itself is dimensionless, because non-Newtonian effects are strongly dependent on $C_p$. However, small concentration intervals around any given concentration such as, for example, within 10% of any given concentration, may not have much effect on RI/IV. Further experiments will reveal the error level in RV/IV as a function of concentration, i.e. what must be determined $$\frac{\partial (RI/IV)}{\partial C_p}$$

is in order to assess:

$$\Delta (RI/IV) = \frac{\partial (RI/IV)}{\partial C_p} \Delta C_p. \tag{8}$$

If the difference $\Delta(RI/IV)$ is sufficiently small for any given uncertainty $\Delta C_p$, then this could be very powerful because it means that a fair amount of uncertainty in $C_p$ could be tolerated while still obtaining an accurate and precise value of RI/IV.

FIG. 1 illustrates a device 100 for rapidly and incrementally or continuously measuring rheological properties of polymer samples, according to an example embodiment of the present disclosure. As depicted in FIG. 1, the device 100 may include a pump 110 coupled to a sample 105. The pump 110 is further coupled with capillary viscometers 115, 120, 125 via a serial sample path through a series of capillaries of varying radii, such that the reduced viscosity $\eta_r$ (RV) can be measured at more than one average shear rate in the sample path. The capillary viscometers 115, 120, 125 are depicted in FIG. 1 as capillaries connected via 'T-connections' to differential pressure transducers. While device 100 is depicted as including three viscometers, device 100 may include any number of viscometers in series. Accordingly, viscometer 125 may be considered "viscometer n," referring to any device 100 design that includes any "n" number, including zero, of viscometers in addition to "viscometer 1" 115 and "viscometer 2" 120. Any number of viscometer arrangements are within the spirit and scope of the present disclosure. While FIG. 1 depicts device 100 as including viscometers 115, 120, 125 arranged in series, device 100 may include viscometers 115, 120, 125 arranged in parallel or arrange as a combination of in series and in parallel. The arrangements of the viscometers are not limited to the series arrangement depicted in FIG. 1. In at least some instances, the two or more viscometers may be fluidically coupled. In other instances, the two or more viscometers may not be fluidically coupled.

Pump 110 is configured to introduce a stream of polymer sample 105 through viscometers 115, 120, 125 during an interval of time. In at least some instances, pump 110 is configured to introduce a stream of polymer sample 105 such that it continuously flows sample 105 through viscometers 115, 120, 125. Devices having more than one pump are within the spirit and scope of the present disclosure. In at least some instances, device 100 may include more than one pump. For instance, device 100 may include two pumps, three pumps or any number of pumps. In at least some instances, device 100 may include one pump for every viscometer. In such cases each pump 110 is configured to introduce a stream of polymer sample 105 through one viscometer. Pump 110 may be any suitable type of pump, including, but not limited a piston pump or isocratic pump, such as that found in HPLC systems, a syringe pump, or a peristaltic pump. In at least some instances, the flow in device 100 may be continuous through all detectors.

Figure 2:
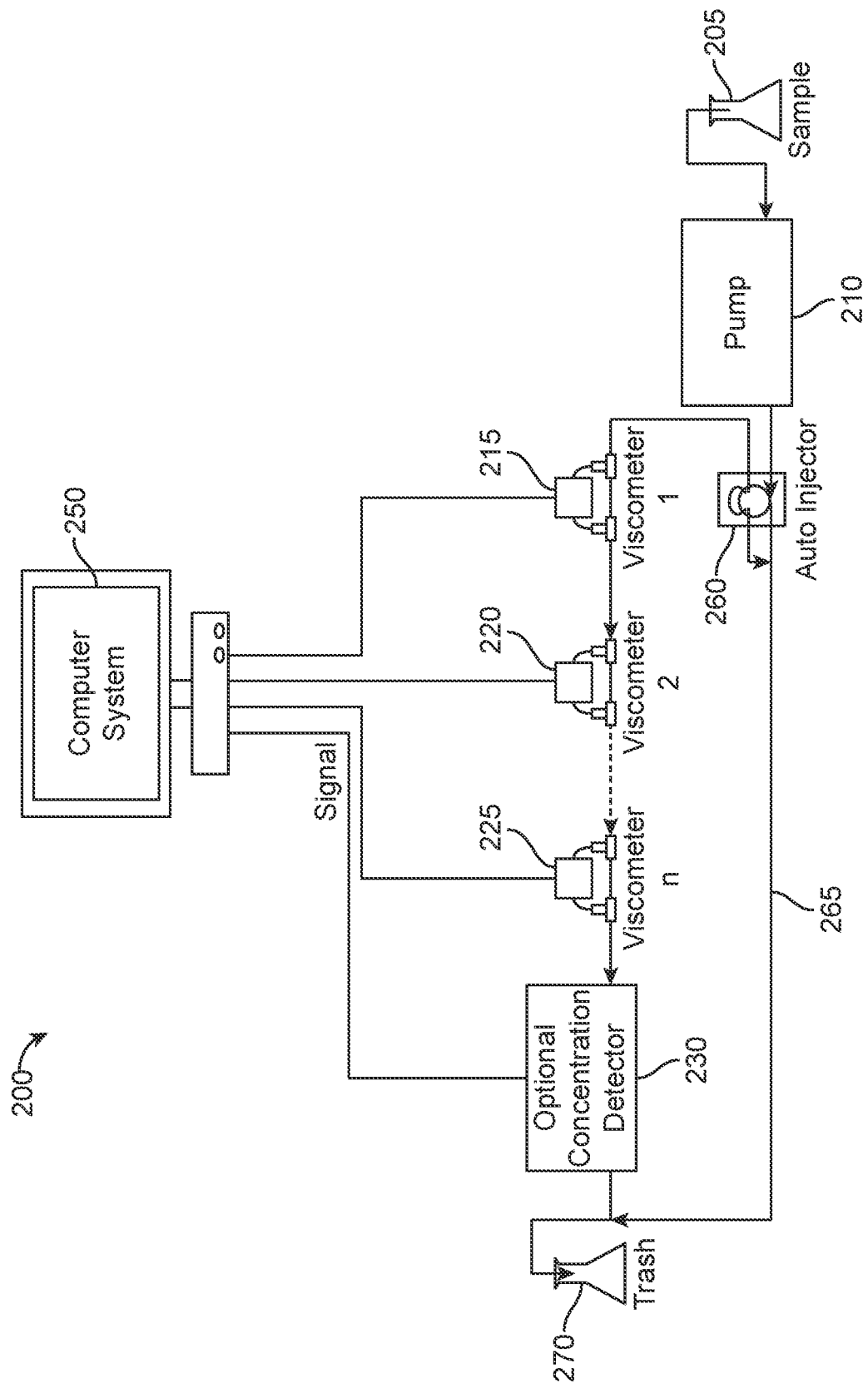
FIG. 2 illustrates an alternative device for rapidly and incrementally or continuously measuring rheological properties of polymer samples in which polymer sample may be injected at desired time intervals, according to an example embodiment of the present disclosure.
Figure 3:
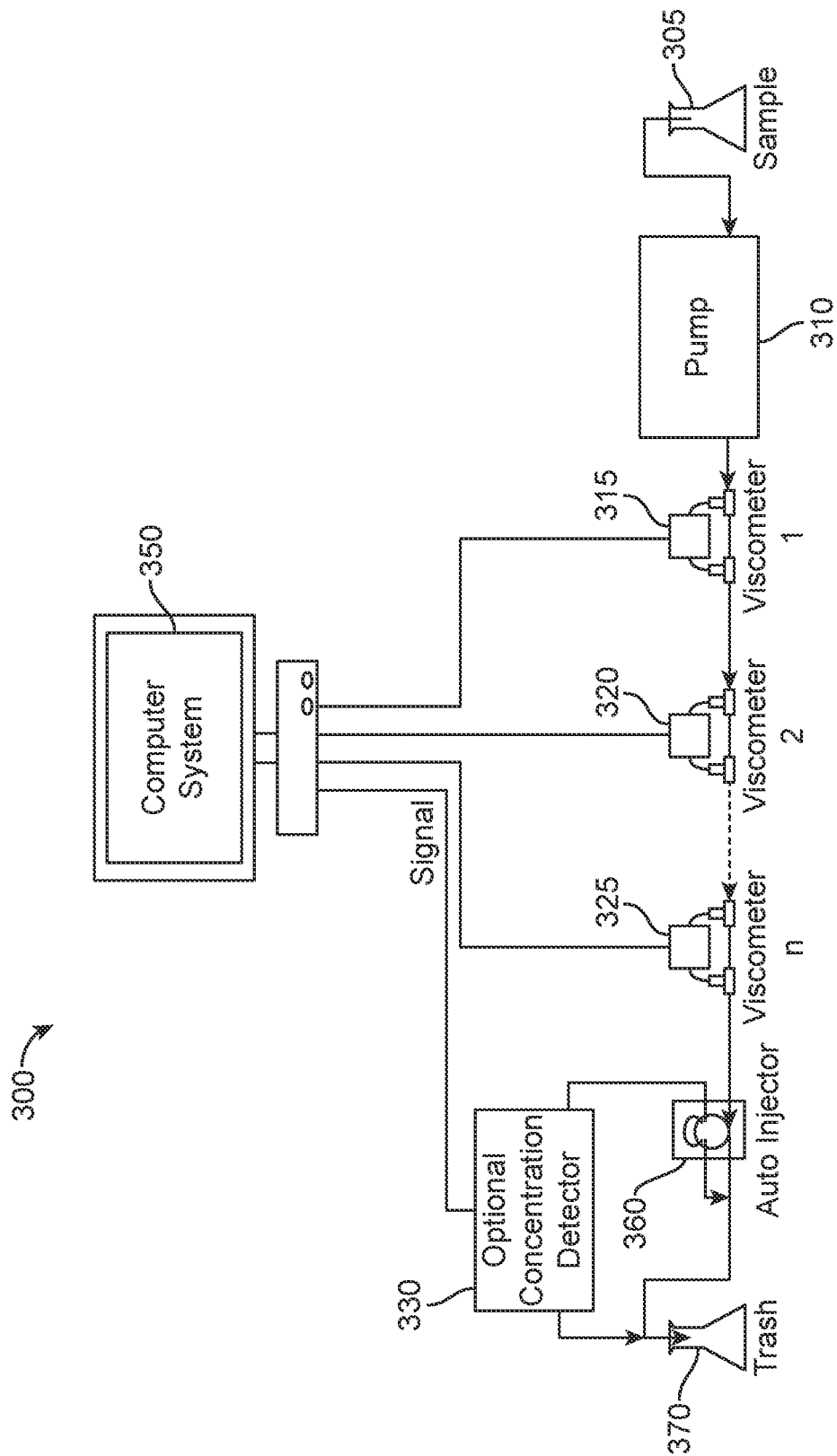
FIG. 3 illustrates an alternative device for rapidly and incrementally or continuously measuring rheological properties of polymer samples in which polymer sample may be injected at desired time intervals with continuous flow through the viscometers, according to an example embodiment of the present disclosure.

According to at least one aspect of the present disclosure, samples 105, as well as samples 205 and 305, depicted in FIGS. 2 and 3, may include polymer samples in solution, polymer samples in a mixture or composition, or polymer samples that are free of solvent, or polymer samples under different shear rates. In at least some instances, samples 105, 205, 305 may be drawn from a reactor or vessel containing a non-reacting sample. In addition to polymer solutions, samples 105, 205, 305, may also comprise one selected from the group comprising, a polymer, a colloid, a product produced by a chemical reaction, an aliquot from another sample, endproducts of a chemical reaction, and any combination thereof.

As depicted in FIG. 1, device 100 includes computer system 150 coupled with viscometers 115, 120, 125. Computer system 150 provides a means of recording the signals from viscometers as well as a means of computing RV from the measurements. As further depicted in FIG. 1, device 100 may optionally include a concentration detector 130 for determining the concentration of a polymer in solution when the concentration is unknown. If the polymer concentration is known, the concentration detector 130 may be omitted from device 100. Concentration detectors 130 may include, but are not limited to, differential index of refraction detectors, ultraviolet or visible absorption spectrophotometers, infra-red absorption detectors, Raman detectors, polarimeters, conductivity sensors, evaporative light scattering detectors, NMR, or any other suitable detector. After passing through the optional concentration detector 130, the polymer samples may be discarded in the trash 170.

According to at least one aspect of the present disclosure, measurements made by viscometers 115, 120, 125, as well as measurements of concentration by concentration detector 130 may be continuous. In such cases, computer system 150 may be configured to determine RV based on the continuous measurements made by viscometers 115, 120, 125.

FIG. 2 illustrates an alternative device 200 for rapidly and incrementally or continuously measuring rheological properties of polymer samples in which polymer sample may be injected at desired time intervals, according to an example embodiment of the present disclosure. In at least some instances, device 200 may be capable of an intermittent or incremental measurement of viscosity, RV, and concentration. This may be accomplished via injection of a pulse of polymer sample into the continuously flowing solvent stream, instead of a continuous sample feed of polymer sample from a pump through the detectors. As depicted in FIG. 2, device 200 includes pump 210 coupled with a polymer sample 205 and auto injector 260. Pump 210 and auto injector 260 may be coupled with an injection loop 265, collectively capable of feeding a pulse of sample through viscometers 215, 220, 225, and optional concentration detector 230. For instance, the injection loop 265 may be similar to that used in Gel Permeation Chromatography. The injection loop 265 may include a metering device, such as a metering pump, as well as a control valve or other type of fluid metering equipment. The volume of the injection loops can range from as low as 10 microliters for very short pulses up to many milliliters when it is desired to achieve a pulse with a plateau value. The pulse injections of sample 205 into the detectors 215, 220, 225, 230 may occur at desired intervals, even or unevenly spaced over time. Polymer sample flow may be injected into the entire detector train at desired intervals. The sample injections may also occur automatically using a programmable injector valve, and any desired time spacing may be programmed for making injections.

As depicted in FIG. 2, pump 210, auto injector 260, and the injection loop 265 are coupled with capillary viscometers 215, 220, 225 similar to those described above with respect to FIG. 1. While device 200 is depicted as including three viscometers, device 200 may include any number of viscometers in series. Accordingly, viscometer 225 may be considered "viscometer n," referring to any device 200 design that includes any "n" number, including zero, of viscometers in addition to "viscometer 1" 215 and "viscometer 2" 220. Any number of viscometer arrangements are within the spirit and scope of the present disclosure. While FIG. 2 depicts device 200 as including viscometers 215, 220, 225 arranged in series, device 200 may include viscometers 215, 220, 225 arranged in parallel or arrange as a combination of in series and in parallel. The arrangements of the viscometers are not limited to the series arrangement depicted in FIG. 2.

In at least some instances, device 200 may include more than one pump. For instance, device 200 may include two pumps, three pumps or any number of pumps. In at least some instances, device 200 may include one pump for every viscometer.

As depicted in FIG. 2, device 200 includes computer system 250 coupled with viscometers 215, 220, 225. Computer system 250 provides a means of recording the signals from viscometers as well as a means of computing RV from the measurements. As further depicted in FIG. 2, device 200 may optionally include a concentration detector 230 for determining the concentration of a polymer in solution when the concentration is unknown. If the polymer concentration is known, the concentration detector 230 may be omitted from device 200. Concentration detectors 230 may include, but are not limited to, differential index of refraction detectors, ultraviolet or visible absorption spectrophotometers, infra-red absorption detectors, Raman detectors, polarimeters, conductivity sensors, evaporative light scattering detectors or any other suitable detector. After passing through the optional concentration detector 230, the polymer samples may be discarded in the trash 270.

FIG. 3 illustrates an alternative device 300 for rapidly and incrementally or continuously measuring rheological properties of polymer samples in which polymer sample may be introduced at desired time intervals with continuous flow through the viscometers, according to an example embodiment of the present disclosure. In at least some instances, device 300 may be capable of making an intermittent or incremental measurement of concentration via an injector valve, a secondary pump or other device configured to provide a periodic pulse of sample 305 into the concentration detector 330 while the viscometers 315, 320, 325 have a continuous flow of sample through them. This may be accomplished by auto injector 360 coupled to pump 310 via viscometers 315, 320, 325. As depicted in FIG. 3, pump 310 is coupled with sample 305. In such instances, a continuous flow through viscometers 315, 320, 325 occurs. This periodic concentration value $C_p$ would then feed back into the computer system 350, coupled with viscometers 315, 320, 325 and concentration detector 330, thereby providing a means for calculating the viscosity and RV results.

The pulse injections of sample 305 into the concentration detector 330 may occur at desired intervals, even or unevenly spaced over time. Polymer sample flow may be injected into the entire detector train at desired intervals. The sample injections may also occur automatically using a programmable injector valve, and any desired time spacing may be programmed for making injections.

While device 300 is depicted as including three viscometers, device 300 may include any number of viscometers in series. Accordingly, viscometer 325 may be considered "viscometer n," referring to any device 300 design that includes any "n" number, including zero, of viscometers in addition to "viscometer 1" 315 and "viscometer 2" 320. Any number of viscometer arrangements are within the spirit and scope of the present disclosure. While FIG. 3 depicts device 300 as including viscometers 315, 320, 325 arranged in series, device 300 may include viscometers 315, 320, 325 arranged in parallel or arrange as a combination of in series and in parallel. The arrangements of the viscometers are not limited to the series arrangement depicted in FIG. 3.

In at least some instances, device 300 may include more than one pump. For instance, device 300 may include two pumps, three pumps or any number of pumps. In at least some instances, device 300 may include one pump for every viscometer.

As depicted in FIG. 3, device 300 includes computer system 350 coupled with viscometers 315, 320, 325. Computer system 350 provides a means of recording the signals from viscometers as well as a means of computing RV from the measurements. As further depicted in FIG. 3, device 300 may include a concentration detector 330 that may include, but is not limited to, differential index of refraction detectors, ultraviolet or visible absorption spectrophotometers, infra-red absorption detectors, Raman detectors, polarimeters, conductivity sensors, evaporative light scattering detectors, NMR, or any other suitable detector. After passing through the concentration detector 330, the polymer samples may be discarded in the trash 370.

Figure 4:
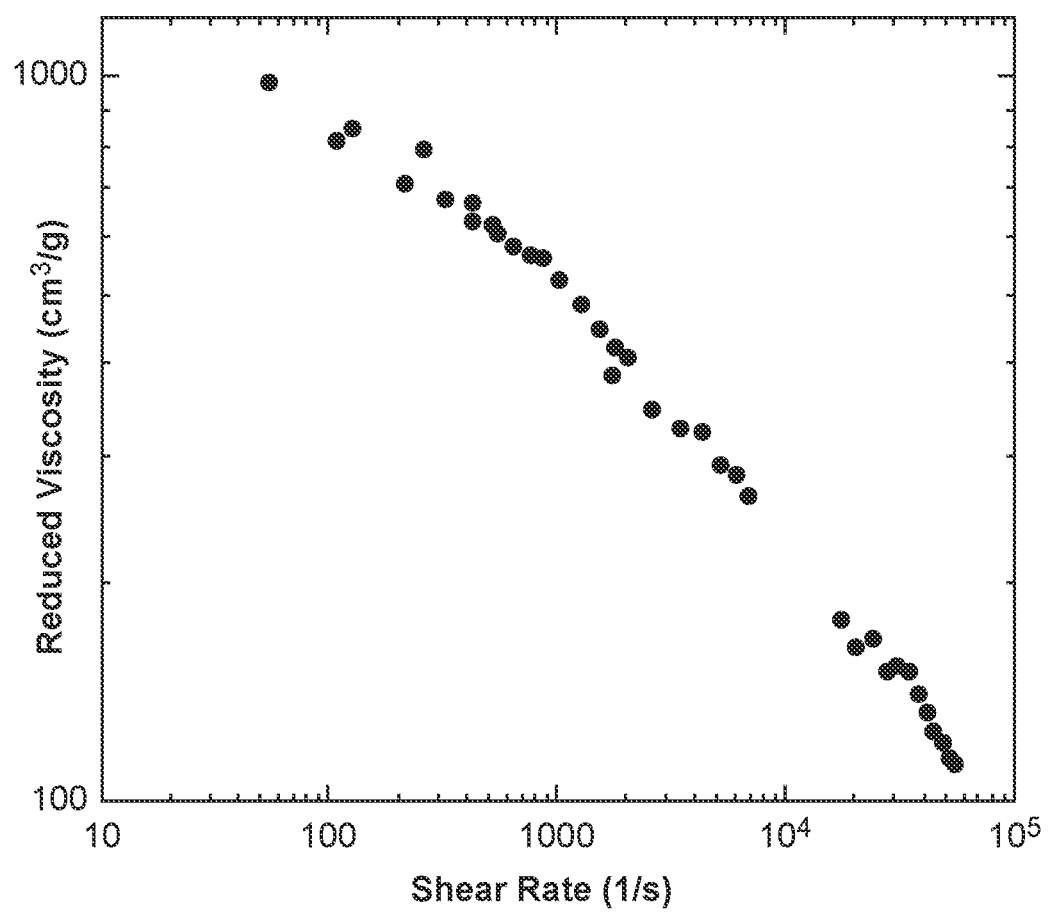
FIG. 4 illustrates data for 3 mg/ml xanthan in 10 mM aqueous NaCl using a device and method comprising a plurality of viscometers, with capillaries having inner diameters of 0.01 inch, 0.02 inch, 0.03 inch, and 0.04 inch, according to an example embodiment of the present disclosure.

FIG. 4 illustrates data for 3 mg/ml xanthan in 10 mM aqueous NaCl collected using a device and method comprising a plurality of viscometers, with capillaries having inner diameters of 0.01 inch, 0.02 inch, 0.03 inch, and 0.04 inch, according to an example embodiment of the present disclosure. Specifically, the data illustrated in FIG. 4 was collected using a device similar to that shown in FIG. 1 but without a concentration detector and with two viscometers. No concentration detector was needed since the xanthan sample solution had a known concentration. The data illustrated in FIG. 4 were collected using flow rates ranging from 0.5 ml/min to 8 ml/min. A Validyne P55-28 pressure transducer, for example, may be used with larger diameter capillaries, and a P55-46 Validyne transducer for smaller diameter capillaries, for example, may be used in series. The solution was formed from 3 mg/ml of xanthan, a biological polymer, in a 10 mM NaCl solution. Very strong shear thinning effects can be clearly seen in FIG. 4. The data points were obtained by varying the flow rate of the solution from 0.5 ml/min to 8 ml/min to obtain a wider range of shear rates than would be provided by a single flow rate through capillaries having different shear rates. However, use of the device does not require use of multiple flow rates, since at any given flow rate the differences in $\eta_r$ are extremely large and indicate shear thinning effect.

Figure 5:
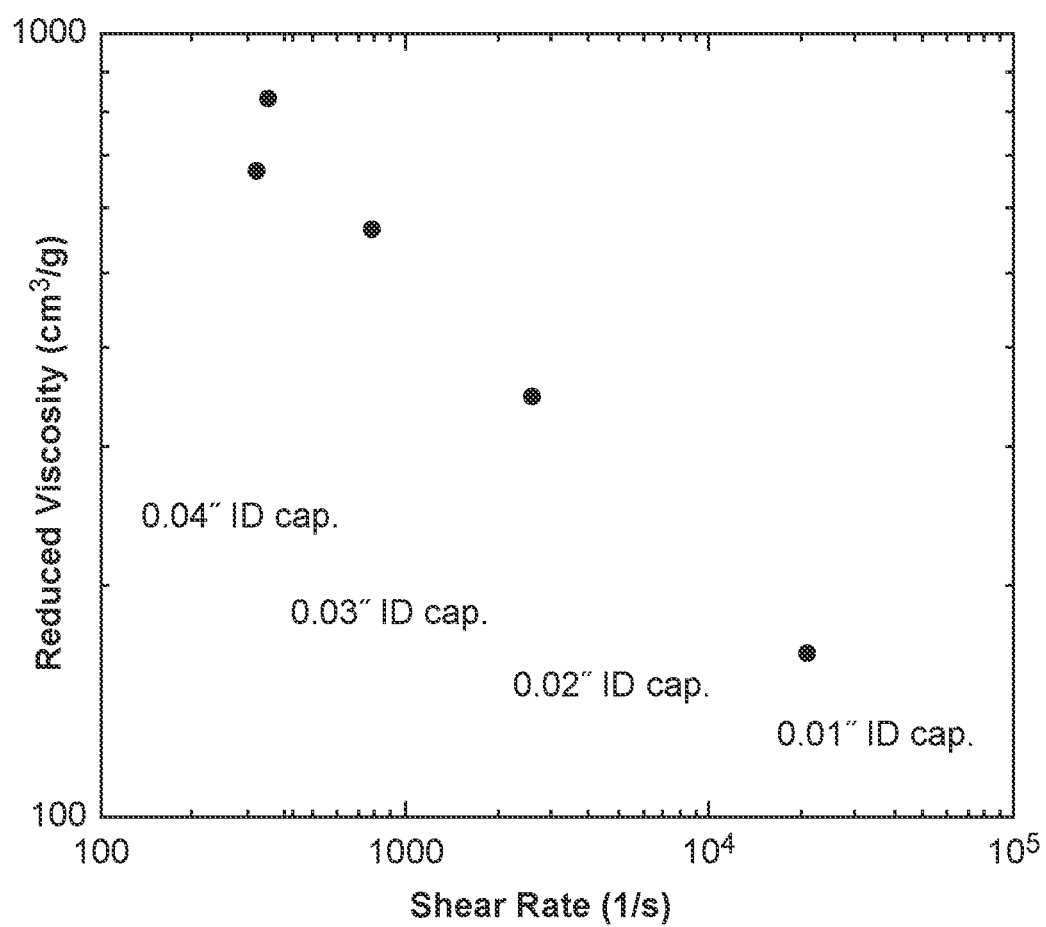
FIG. 5 illustrates data for the same conditions used for FIG. 4 but using a Q=3 ml/min flow rate only, for each of the viscometers, according to an example embodiment of the present disclosure.

FIG. 5 illustrates data for the same conditions used for FIG. 4 but using a Q=3 ml/min flow rate only, for each of the viscometers, according to an example embodiment of the present disclosure. The data illustrated in FIG. 5 was obtained for the four capillaries shown, taken two at a time with the average shear rate computed according to Eqn. 4. This type of data is obtained conveniently without varying flow rate, and can be valuable for online monitoring of polymerization reactions.

According to at least one aspect of the present disclosure, a series of ordinary pressure transducers, changing the diameter of tubing between them, and measuring the difference in pressure across each of these tubes can be used. In some instances, the devices herein can include: (i) the use of 'T' connectors between viscometers to change polymer concentration, and solvent conditions such as solvent composition, mixtures of solvents, or changes in ionic strength, pH, etc.; (ii) changing temperatures between viscometers; (iii) using parallel paths in addition to or instead of serial paths; (iv) using flow ramps, either in steps or continuous ramps, to enable obtaining additional shear rate data; (v) specifying that the measurements are made on a continuous flow of polymer sample, over an interval of time, where the 'interval of time' may include less than a minute just to make a few measurements and then stopped, or running continuously for minutes, or hours, or the length of an entire reaction, or the length of an entire polymer production cycle (e.g. many months); and (vi) specifying that the simultaneous rheological measurements can be used for control of the production of polymer in continuous, batch and semi-batch processes.

Figure 6:
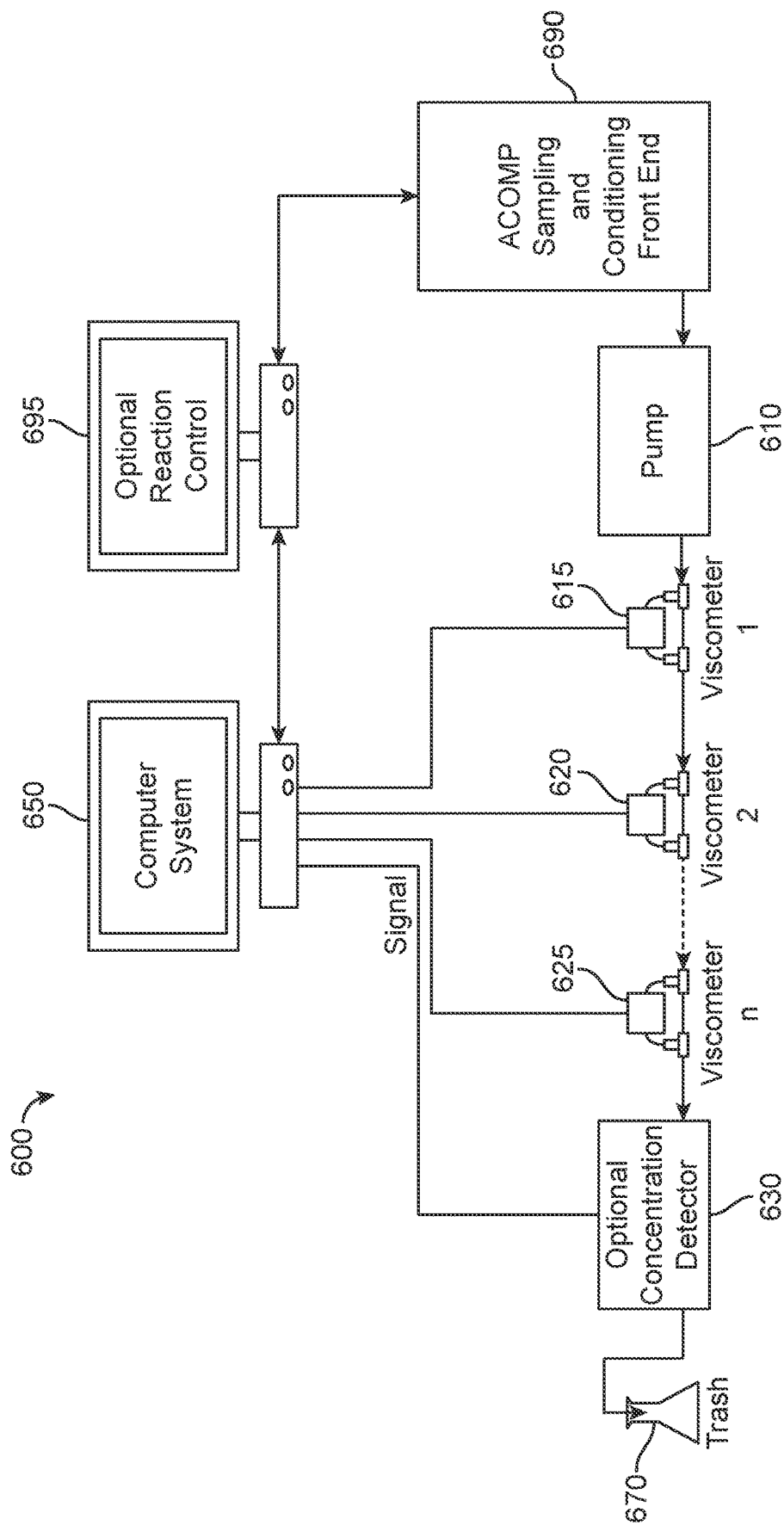
FIG. 6 illustrates an alternative device for rapidly and incrementally or continuously measuring rheological properties of polymer samples in which the viscometers and optional concentration detector are supplied with flowing polymer solution sample from an ACOMP unit.

According to at least one aspect of the present disclosure, the presently disclosed devices and methods may be used in conjunction with automatic continuous online monitoring of polymerization reactions (ACOMP), as shown in FIG. 6. As depicted in FIG. 6, viscometers 615, 620, 625 and optional concentration detector 630 of device 600 are supplied with flowing polymer solution sample from an ACOMP unit 690. In such instances, the ACOMP 'front-end' continuously extracts sample from a reactor and dilutes and conditions it so as to produce an analytical grade sample stream on which highly precise and accurate measurements can be made. In some instances, device 600 can be coupled with the output of the ACOMP front end, such that the ACOMP front end provide sample to the device for continuous, intermittent or incremental analysis. These measurements can also be used to actively control a polymerization reaction, either manually or automatically.

The ACOMP unit 690 may also include an optional reaction control module 695 coupled with the ACOMP unit 690 and computer system 650. The reaction control module 695 may be configured to carry out online monitoring of the rheological properties of a polymer sample by obtaining rheological properties, such as RV, from computer system 650. Based on the rheological properties obtained from the computer system 650 and/or the online monitoring of the rheological properties, the reaction control module 695 may also control derivitization or chemical or enzymatic modification process steps to obtain polymers or polymer solutions or mixtures with desired rheological properties. In such control, the derivitization or modification process steps, including types and quantities of reagents used, temperature, pressure, and processing time may be controlled by the reaction control module 695 by the reaction control module 695 communicating one or more commands to the ACOMP unit 690 thereby causing the ACOMP unit 690 to adjust a control agent capable of causing derivitization or modifying one or more process steps. Control agents that may be controlled in order to obtain polymers with desired rheological properties may include, but are not limited to, acids, bases, carboxylation agents, sulfonation agents, methylation agents, or any other suitable agent.

The reaction control module 695 may also control the production of an EPDM, SBR, or other rubber, in which a steady state reaction is used, where the device is used to determine when the reaction reaches the desired steady state yielding polymer with the required rheological properties. The reaction control module 695 can also be used to control and maintain the steady state, once reached, by continued monitoring of the rheological properties of the polymer produced during the steady state. Likewise, the reaction control module's measurements can be used to control these types of polymerization when carried out in batch and semi-batch processes. As used herein, "batch process" refers to the use of a reactor in which the polymerization process is carried out without significant addition of material to the reactor during the process. The term "semi-batch," as used herein, refers to polymerization reactions in which reagents, such as monomers, initiators, catalysts, branching and chain transfer agents, etc. are introduced into the reactor during the reaction.

As depicted in FIG. 6, device 600 includes ACOMP unit 690 coupled with pump 610 which, in turn, is coupled with viscometers 615, 620, 625. Pump 610 is capable of delivering polymer sample from ACOMP unit 690 to viscometers 615, 620, 625 via a serial sample path through a series of capillaries of varying radii, such that the reduced viscosity $\eta_r$ (RV) can be measured at more than one average shear rate in the sample path. While device 600 is depicted as including three viscometers, device 600 may include any number of viscometers in series. Accordingly, viscometer 625 may be considered "viscometer n," referring to any device 600 design that includes any "n" number, including zero, of viscometers in addition to "viscometer 1" 615 and "viscometer 2" 620. Any number of viscometer arrangements are within the spirit and scope of the present disclosure. While FIG. 6 depicts device 600 as including viscometers 615, 620, 625 arranged in series, device 600 may include viscometers 615, 620, 625 arranged in parallel or arrange as a combination of in series and in parallel. The arrangements of the viscometers are not limited to the series arrangement depicted in FIG. 6.

In at least some instances, device 600 may include more than one pump. For instance, device 600 may include two pumps, three pumps or any number of pumps. In at least some instances, device 600 may include one pump for every viscometer.

As depicted in FIG. 6, device 600 includes computer system 650 coupled with viscometers 615, 620, 625. Computer system 650 provides a means of recording the signals from viscometers as well as a means of computing RV from the measurements. As further depicted in FIG. 6, device 600 may include a concentration detector 630 that may include, but is not limited to, differential index of refraction detectors, ultraviolet or visible absorption spectrophotometers, infra-red absorption detectors, Raman detectors, polarimeters, conductivity sensors, evaporative light scattering detectors or any other suitable detector. After passing through the concentration detector 630, the polymer samples may be discarded in the trash 670.

The ACOMP unit 690 depicted in FIG. 6 and described further with respect to FIG. 7 below may also be coupled with pumps 110, 210, 310 of FIGS. 1, 2, and 3, respectively, so as to deliver polymer sample to the respective devices 100, 200, 300. Therefore the ACOMP unit 690 may be put into the fluid contact with the fully discrete mode of device 200 depicted in FIG. 2 or the discrete concentration/continuous viscometer mode of device 300 depicted in FIG. 3.

Figure 7:
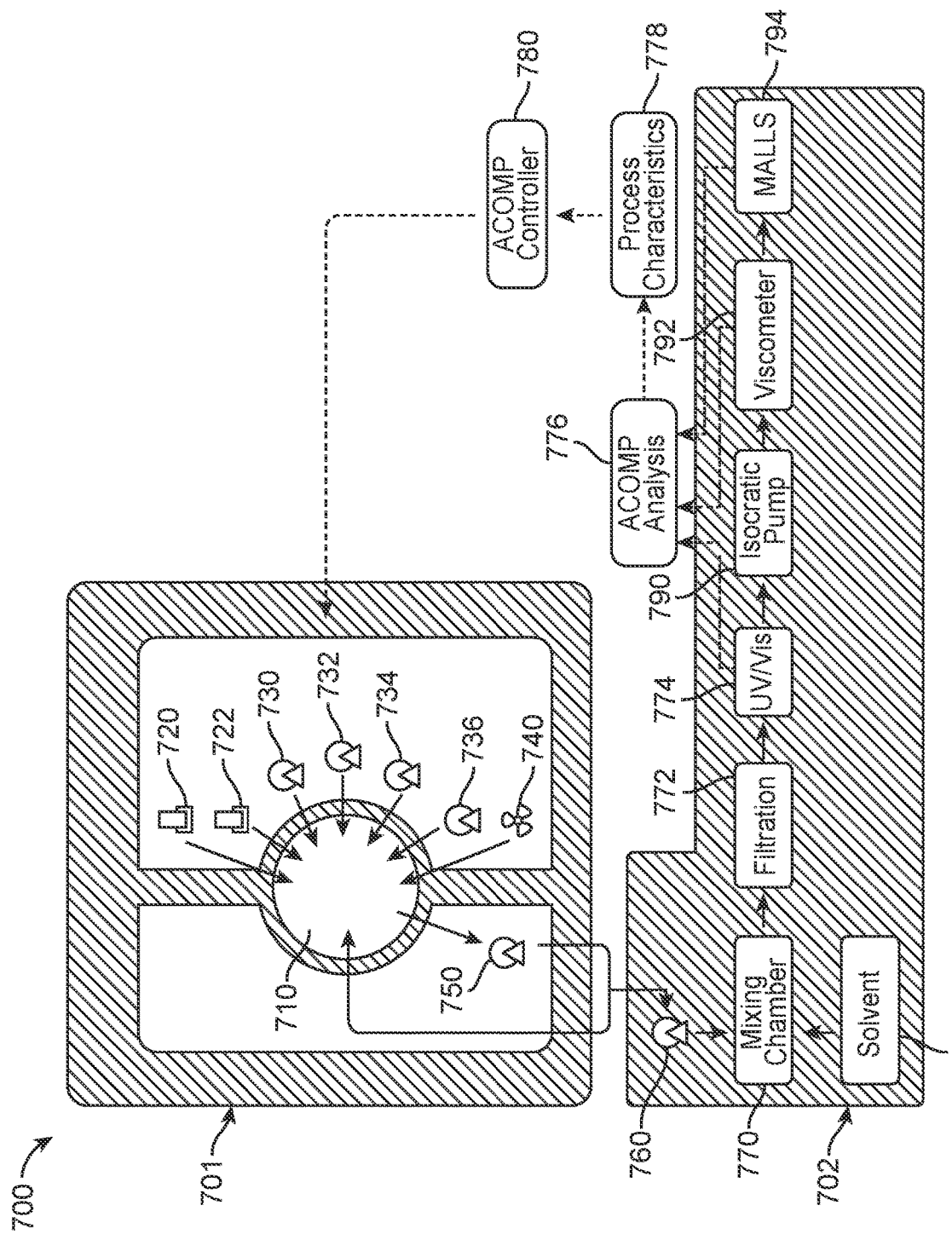
FIG. 7 illustrates an ACOMP unit, according to an example embodiment of the present disclosure.

FIG. 7 illustrates an ACOMP unit 700, such as ACOMP unit 690 depicted in FIG. 6, according to an example embodiment of the present disclosure. The ACOMP unit 700 includes an ACOMP reactor control interface 701 and an ACOMP analysis control interface 702. In at least some instances, the ACOMP reactor control interface 701 and the ACOMP analysis control interface 702 are controlled by a Programmable Logic Controller (PLC) control system (not shown) which is coupled to a computing device (not shown). The computing device can be a desktop or laptop computer, a smartphone, a tablet, or any other similar device. The computing device can allow for visualization and control of process control variables and components of the ACOMP unit 700.

The ACOMP reactor control interface 701 can control various components of the ACOMP unit 700. One component is a reactor 710. The reactor 710 may be any reactor capable of controlling a control agent described above with respect to FIG. 6. The ACOMP unit 700 may further include a mixer 740 that may be located outside of the reactor 710 and be capable of mixing samples contained in reactor 710. ACOMP unit 700 may further include flow controllers 720, 722 capable of delivering gases into reactor 710. As depicted in FIG. 7, ACOMP unit 700 may further include pumps 730, 732, 734 capable of delivering solutions or liquids to reactor 710. The reactor 710 and contents contained therein can also be subjected to heating or cooling from temperature controller 736. Reaction 710 may also be coupled with a recycle pump 750 coupled with a bottom portion of reaction 710 via a drain port (not shown) and a ball valve (not shown). Reactor 710 contents can be continuously extracted through the recycle pump 750 and recycled back into the top of the reactor 710. An extraction pump 760 connects the ACOMP system interface 702 to the reactor control interface 701 via the recycle pump 750.

As depicted in FIG. 7, the extracted reactor contents may be combined with a flow of quenching solvent from solvent source 768. Once the reactor contents are combined with the quenching solvent, the combination may be passed by inert propylene tubing to a dynamic mixing chamber 770. The mixing chamber 770 can be used to actively stir and combine the two continuous streams of reactor contents and solvent into one homogeneous mixture. After the homogenous solution leaves the mixing chamber, it may be passed through a filtration system 772 to remove any particulate or gel matter that may have been removed from the reaction 710 with the reactor contents. The filtered homogeneous solution can then be flowed through one or more inline analytical detectors such as a UV/Visible absorption spectrometer 774. A fraction of the sample stream may be diverted by pump 790 to one or more viscometers 792, such as the viscometers described above with respect to FIGS. 1-3, and a Multi Angle Laser Light Scattering (MALLS) detector 794. The ACOMP unit 700 includes an on board analysis package 776 capable of analyzing data obtained by detectors 774, 792, 794. The analysis package 776 may in some instances respond to manual operation triggers through interface with Automation and Control software. These triggers instruct the analysis software to perform key analysis algorithms appropriate to each step or phase in the polymer reaction process. Process characteristics 778 may be determined based on the analysis carried out by the analysis package 776.

The ACOMP unit 700 may further include a process controller 780 coupled with the ACOMP reactor control interface 701 and the ACOMP analysis control interface 702 to provide a means by which the user can interact with the ACOMP reactor control interace 701 to perform the operations that may control or influence polymer reactions in reactor 710.

Possible applications of the presently disclosed devices and methods include the measurement of any synthetic or natural polymeric material where rheological, viscosity or viscoelastic measurements are used to characterize end products and influence the quality and performance of the polymeric material. While traditional rheological measurements include, but are not limited to, Melt Flow Index, Mooney Viscosity and bulk viscosity, the presently disclosed devices and methods allow for rapidly and continuously, intermittently or incrementally measuring rheological characteristics. These properties are related directly to Molecular Weight, Molecular Weight Distribution and polydispersity, branching and cross-linking, polymer architecture, processability, supramolecular assembling, self-organizing properties, viscosity control, and other similar properties. Typical products where these types of measurements are important include, but are not limited to, biopolymers such as xanthan, guar, alginates, pectins, gum Arabic, carageenans, chemically modified versions thereof and derivatives thereof. Some applications for these include, but are not limited to, fluid viscosity modification in energy, personal care, alimentary, mining, metallurgical, papermaking, and water treatment applications. There are also many synthetic polymers used in these areas, such as, but not limited to, polyacrylamides and its copolymers and derivatives, such as p(n-isopropyl acrylamide), polyvinylpyrrolidone and its copolymers, polyethylene glycol and its copolymers, and other similar synthetic polymers.

Such measurements can be important for many types of synthetic rubbers such as Styrene Butadiene Rubber (SBR), Ethylene Propylene Diene Monomer Rubber (EPDM), Ethylene Propylene Rubber (EP),Acrylonitrile Butadiene Styrene (ABS), Polyacrylate Rubber, Ethylene Acrylate Rubber, Polybutadiene, Isobutylene Isoprene Butyl, Polyurethane, Silicone Rubbers, or any other suitable synthetic rubber. Such measurements can also be important for many types of synthetic plastic materials such as polyolefins, specialty styrenic or acrylic plastics. Data obtained by use of the devices and methods herein can be used to measure the RV and make adjustments to the production process based on real-time rheologically similar measurements.

Statements of the Disclosure Include:

Statement 1: A device comprising: at least one pump configured to accept a sample solution during an interval of time; two or more viscometers; an injector configured to introduce a flow of the sample solution through the two or more viscometers; and a computer system configured to monitor and measure rheological properties of the sample solution under at least two shear rates in the two or more viscometers, wherein the rheological properties comprises a viscosity of the solution.

Statement 2: A device according to Statement 2, wherein the two or more viscometers are coupled with each other.

Statement 3: A device according to Statement 2 or Statement 3, wherein the injector is configured to introduce a flow of the sample solution as pulses of discrete volume through the two or more viscometers.

Statement 4: A device according to any one of the preceding Statements 1-3, wherein the two or more viscometers are single capillary viscometers.

Statement 5: A device according to any one of the preceding Statements 1-4, wherein the two or more viscometers are coupled in series.

Statement 6: A device according to any one of the preceding Statements 1-4, wherein the two or more viscometers are coupled in parallel.

Statement 7: A device according to any one of the preceding Statements 1-4, wherein the two or more viscometers are coupled in a combination of a series flow path and a parallel flow path.

Statement 8: A device according to any one of the preceding Statements 1-7, wherein a change of an experimental parameter of the polymer solution is made between at least two of the two or more viscometers.

Statement 9: A device according to Statement 8, wherein the change is made by a 'T'-connection between the at least two of the two or more viscometers, wherein the T-connection is configured for the input of a liquid between the at least two of the two or more viscometers.

Statement 10: A device according to Statement 8, wherein the change is an increase or decrease the polymer concentration between the at least two of the two or more viscometers.

Statement 11: A device according to Statement 8, wherein the change is an increase or decrease in ionic strength and/or pH between the at least two of the two or more viscometers.

Statement 12: A device according to Statement 8, wherein the change is an introduction of a mixture of solvents between the at least two of the two or more viscometers.

Statement 13: A device according to Statement 8, wherein the change is an increase or decrease in temperature between the at least two of the two or more viscometers.

Statement 14: A device according to Statement 8, wherein the change is an increase or decrease in shear rate between the at least two of the two or more viscometers, wherein the shear rate is changed by increasing or decreasing the flow rate through the at least two or more viscometers.

Statement 15: A device according to Statement 14, wherein the flow rate is increased or decreased intermittently or incrementally.

Statement 16: A device according to Statement 14, wherein the flow rate is increased or decreased continuously.

Statement 17: A device according to any one of the preceding Statements 1-16, wherein the interval of time is seconds.

Statement 18: A device according to any one of the preceding Statements 1-16, wherein the interval of time is minutes.

Statement 19: A device according to any one of the preceding Statements 1-16, wherein the interval of time is an hour or more.

Statement 20: A device according to any one of the preceding Statements 1-18, wherein the interval of time is from the beginning of a polymerization reaction process to the end of the polymerization reaction process.

Statement 21: A device according to any one of the preceding Statements 1-20, wherein discrete amounts of the continuous stream of polymer solution are injected into the device at intervals separated in time.

Statement 22: A device according to any one of the preceding Statements 1-21, further comprising a detector for measuring polymer concentration of the sample solution.

Statement 23: A device according to any one of the preceding Statements 1-22, wherein the device is further configured for injection of discrete amounts of the continuous stream of sample solution into the concentration detector at intervals separated in time, and configured for continuous flow of sample solution through the two or more viscometers.

Statement 24: A device according to any one of the preceding Statements 1-23, wherein the polymer in the continuous stream of sample solution accepted by the device is produced during a polymerization reaction which is being monitored by the device of claim 1.

Statement 25: A device according to any one of the preceding Statements 1-24, wherein the polymer in the stream is provided to the device by an ACOMP system.

Statement 26: A device according to any one of the preceding Statements 1-25, wherein the measurements obtained by the device are used to control the polymerization reaction.

Statement 27: A device according to any one of the preceding Statements 1-26, wherein the sample solution comprises one selected from the group comprising, a polymer, a colloid, a product produced by a chemical reaction, an aliquot from another sample, endproducts of a chemical reaction, and any combination thereof Statement 28: A method comprising: producing a stream of a sample solution during an interval of time; introducing a flow of the sample solution through two or more viscometers; monitoring and measuring the viscosity of the sample solution under at least two different shear rates; and obtaining a characterization of the sample based on the at least two viscosity measurements obtained under the at least two different shear rates.

Statement 29: A method according to Statement 28, wherein the sample solution comprises a polymer.

Statement 30: A method according to Statement 29, further comprising determining the concentration of polymer.

Statement 31: A method according to Statement 29 or Statement 30, further comprising assessing the quality of the polymer produced by the polymerization process based on the obtained characterization of the polymer.

Statement 32: A method according to any one of the preceding Statements 29-31, further comprising making control decisions during the polymerization process based on the obtained characterization of the polymer.

Statement 33: A method according to any one of the preceding Statements 29-32, further comprising establishing a change over of grade in a continuous polymer production process based on the obtained characterization of the polymer.

Statement 34: A method according to any one of the preceding Statements 29-33, further comprising maintaining a steady state of operation during a continuous polymer production process based on the obtained characterization of the polymer.

Statement 35: A method according to any one of the preceding Statements 29-34, further comprising the reaction conditions for the polymer being produced in a batch or semi-batch reactor based on the obtained characterization of the polymer.

Statement 36: A method according to any one of the preceding Statements 29-35, further comprising controlling one or more reaction conditions, wherein the one or more reaction conditions include a flow of monomers into the reactor, a flow of initiator or catalyst into the reactor, a flow of branching or cross-linking agent into the reactor, a flow of a chain transfer agent into the reactor, a flow of inhibitor into the reactor, a temperature of the reactor, a stir rate of the reactor.

Statement 37: A method according to any one of the preceding Statements 29-36, wherein the two or more viscometers are single capillary viscometers.

Statement 38: A method according to any one of the preceding Statements 29-37, wherein the two or more viscometers are coupled in series.

Statement 39: A method according to any one of the preceding Statements 29-37, wherein the two or more viscometers are coupled in parallel.

Statement 40: A method according to any one of the preceding Statements 29-37, wherein the two or more viscometers are coupled in a combination of a series flow path and a parallel flow path.

Statement 41: A method according to any one of the preceding Statements 29-40, further comprising changing an experimental parameter of the polymer solution between at least two of the two or more viscometers.

Statement 42: A method according to any one of the preceding Statements 29-41, wherein the change is made by a 'T'-connection between the at least two of the two or more viscometers, wherein the T-connection is configured for the input of a liquid between the at least two of the two or more viscometers.

Statement 43: A method according to Statement 41, wherein changing the experimental parameter comprises an increase or decrease the polymer concentration between the at least two of the two or more viscometers.

Statement 44: A method according to Statement 41, wherein changing the experimental parameter comprises an increase or decrease in ionic strength and/or pH between the at least two of the two or more viscometers.

Statement 45: A method according to Statement 41, wherein changing the experimental parameter comprises an introduction of a mixture of solvents between the at least two of the two or more viscometers.

Statement 46: A method according to Statement 41, wherein changing the experimental parameter comprises an increase or decrease in temperature between the at least two of the two or more viscometers.

Statement 47: A method according to Statement 41, wherein changing the experimental parameter comprises an increase or decrease in shear rate between the at least two of the two or more viscometers, wherein the shear rate is changed by increasing or decreasing the flow rate through the at least two or more viscometers.

Statement 48: A method according to any one of the preceding Statements 28-47, wherein the flow rate is increased or decreased intermittently or incrementally.

Statement 49: A method according to any one of the preceding Statements 28-47, wherein the flow rate is increased or decreased continuously.

Statement 50: A method according to any one of the preceding Statements 28-49, wherein the interval of time is seconds.

Statement 51: A method according to any one of the preceding Statements 28-49, wherein the interval of time is minutes.

Statement 52: A method according to any one of the preceding Statements 28-49, wherein the interval of time is an hour or more.

Statement 53: A method according to any one of the preceding Statements 29-52, wherein the interval of time is from the beginning of a polymerization reaction process to the end of the polymerization reaction process.

Statement 54: A method according to any one of the preceding Statements 29-53, wherein discrete amounts of the sample are injected through the two or more viscometers at intervals separated in time.

Statement 55: A method according to any one of the preceding Statements 29-54, further comprising measuring a polymer concentration using a detector.

Statement 56: A method according to any one of the preceding Statements 29-54, further comprising injecting discrete amounts of the continuous stream of sample solution into the concentration detector at intervals separated in time, and continuously flowing the sample solution through the two or more viscometers.

Statement 57: A method according to any one of the preceding Statements 29-56, wherein the polymer in the stream of polymer solution is produced during a polymerization reaction.

Statement 58: A method according to any one of the preceding Statements 29-57, wherein the polymer in the stream is provided by an ACOMP system.

Statement 59: A method according to any one of the preceding Statements 29-58, wherein the measured viscosity is used to control the polymerization reaction.

Statement 60: A device comprising: two or more viscometers; at least one pump configured to introduce sample through the two or more viscometers during an interval of time; and a computer system configured to monitor and measure rheological properties of the sample under at least two shear rates in the two or more viscometers; wherein the rheological properties comprises a viscosity of the sample.

Statement 61: A device according to Statement 60, wherein the sample comprises a polymer solution.

Statement 62: A device according to Statement 60 or Statement 61, wherein the at least one pump is configured to introduce a sample solution continuously through the two or more viscometers during an interval of time.

Statement 63: A device according to any one of the preceding Statements 60-62, wherein the two or more viscometers are coupled with each other.

Statement 64: A device according to any one of the preceding Statements 60-63, wherein the two or more viscometers are single capillary viscometers.

Statement 65: A device according to any one of the preceding Statements 60-64, wherein the two or more viscometers are coupled in series.

Statement 66: A device according to any one of the preceding Statements 60-64, wherein the two or more viscometers are coupled in parallel.

Statement 67: A device according to any one of the preceding Statements 60-64, wherein the two or more viscometers are coupled in a combination of a series flow path and a parallel flow path.

Statement 68: A device according to any one of the preceding Statements 61-67, wherein a change of an experimental parameter of the polymer solution is made between at least two of the two or more viscometers.

Statement 69: A device according to Statement 68, wherein the change is made by a 'T'-connection between the at least two of the two or more viscometers, wherein the T-connection is configured for the input of a liquid between the at least two of the two or more viscometers.

Statement 70: A device according to Statement 68, wherein the change is an increase or decrease the polymer concentration between the at least two of the two or more viscometers.

Statement 71: A device according to Statement 68, wherein the change is an increase or decrease in ionic strength and/or pH between the at least two of the two or more viscometers.

Statement 72: A device according to Statement 68, wherein the change is an introduction of a mixture of solvents between the at least two of the two or more viscometers.

Statement 73: A device according to Statement 68, wherein the change is an increase or decrease in temperature between the at least two of the two or more viscometers.

Statement 74: A device according to Statement 68, wherein the change is an increase or decrease in shear rate between the at least two of the two or more viscometers, wherein the shear rate is changed by increasing or decreasing the flow rate through the at least two or more viscometers.

Statement 75: A device according to Statement 74, wherein the flow rate is increased or decreased intermittently or incrementally.

Statement 76: A device according to Statement 74, wherein the flow rate is increased or decreased continuously.

Statement 77: A device according to any one of the preceding Statements 60-76, wherein the interval of time is seconds.

Statement 78: A device according to any one of the preceding Statements 60-76, wherein the interval of time is minutes.

Statement 79: A device according to any one of the preceding Statements 60-76, wherein the interval of time is an hour or more.

Statement 80: A device according to any one of the preceding Statements 61-78, wherein the interval of time is from the beginning of a polymerization reaction process to the end of the polymerization reaction process.

Statement 81: A device according to any one of the preceding Statements 61-80, wherein discrete amounts of the continuous stream of polymer solution are injected into the device at intervals separated in time.

Statement 82: A device according to any one of the preceding Statements 61-81, further comprising a detector for measuring polymer concentration of the sample solution.

Statement 83: A device according to Statement 82, wherein the device is further configured for injection of discrete amounts of the continuous stream of sample solution into the concentration detector at intervals separated in time, and configured for continuous flow of sample solution through the two or more viscometers.

Statement 84: A device according to any one of the preceding Statements 61-83, wherein the polymer in the continuous stream of sample solution accepted by the device is produced during a polymerization reaction which is being monitored by the device of claim 1.

Statement 85: A device according to Statement 84, further comprising an ACOMP unit configured to deliver the sample to the at least one pump.

Statement 86: A device according to Statement 85, wherein the measurements obtained by the device are used to control the polymerization reaction.

Statement 87: A device comprising: two or more viscometers; at least one pump configured to introduce a sample solution through the two or more viscometers during an interval of time; and a computer system configured to monitor and measure rheological properties of the sample solution under at least two shear rates in the two or more viscometers, wherein the rheological properties comprises a viscosity of the sample solution.

Statement 88: A device according to Statement 87, wherein the sample solution comprises a polymer.

Statement 89: A device according to Statement 87 or Statement 88, wherein the two or more viscometers are coupled with each other.

Statement 90: A device according to any one of the preceding Statements 87-89, further comprising an injector coupled with the at least one pump and the two or more viscometers.

Statement 91: A device according to Statement 90, wherein the injector is configured to introduce a flow of the sample solution as pulses of discrete volume through the two or more viscometers.

Statement 92: A device according to any one of the preceding Statements 87-89, wherein the at least one pump is configured to introduce a sample solution continuously through the two or more viscometers during an interval of time.

Statement 93: A device according to any one of the preceding Statements 87-92, wherein the two or more viscometers are single capillary viscometers.

Statement 94: A device according to any one of the preceding Statements 87-93, wherein the two or more viscometers are coupled in series.

Statement 95: A device according to any one of the preceding Statements 87-93, wherein the two or more viscometers are coupled in parallel.

Statement 96: A device according to any one of the preceding Statements 87-93, wherein the two or more viscometers are coupled in a combination of a series flow path and a parallel flow path.

Statement 97: A device according to any one of the preceding Statements 87-96, wherein a change of an experimental parameter of the polymer solution is made between at least two of the two or more viscometers.

Statement 98: A device according to Statement 97, wherein the change is made by a 'T'-connection between the at least two of the two or more viscometers, wherein the T-connection is configured for the input of a liquid between the at least two of the two or more viscometers.

Statement 99: A device according to Statement 97, wherein the change is an increase or decrease the polymer concentration between the at least two of the two or more viscometers.

Statement 100: A device according to Statement 97, wherein the change is an increase or decrease in ionic strength and/or pH between the at least two of the two or more viscometers.

Statement 101: A device according to Statement 97, wherein the change is an introduction of a mixture of solvents between the at least two of the two or more viscometers.

Statement 102: A device according to Statement 97, wherein the change is an increase or decrease in temperature between the at least two of the two or more viscometers.

Statement 103: A device according to Statement 97, wherein the change is an increase or decrease in shear rate between the at least two of the two or more viscometers, wherein the shear rate is changed by increasing or decreasing the flow rate through the at least two or more viscometers.

Statement 104: A device according to Statement 103, wherein the flow rate is increased or decreased intermittently or incrementally.

Statement 105: A device according to Statement 103, wherein the flow rate is increased or decreased continuously.

Statement 106: A device according to any one of the preceding Statements 87-105, wherein the interval of time is seconds.

Statement 107: A device according to any one of the preceding Statements 87-105, wherein the interval of time is minutes.

Statement 108: A device according to any one of the preceding Statements 87-105, wherein the interval of time is an hour or more.

Statement 109: A device according to any one of the preceding Statements 87-108, wherein the interval of time is from the beginning of a polymerization reaction process to the end of the polymerization reaction process.

Statement 110: A device according to any one of the preceding Statements 87-109, wherein discrete amounts of the continuous stream of polymer solution are injected into the device at intervals separated in time.

Statement 111: A device according to any one of the preceding Statements 87-110, further comprising a detector for measuring polymer concentration of the sample solution.

Statement 112: A device according to Statement 111, wherein the device is further configured for injection of discrete amounts of the continuous stream of sample solution into the concentration detector at intervals separated in time, and configured for continuous flow of sample solution through the two or more viscometers.

Statement 113: A device according to any one of the preceding Statement 87-112, wherein the polymer in the continuous stream of sample solution accepted by the device is produced during a polymerization reaction which is being monitored by the device of claim Statement 114: A device according to any one of the preceding Statements 87-113, further comprising an ACOMP unit capable of providing sample to the pump.

Statement 115: A device according to any one of the preceding Statements 87-114, further comprising a reaction control unit configured to control the polymerization reaction based on the measurements obtained by the computer system.

Statement 116: A device according to Statement 87, wherein the sample solution comprises one selected from the group comprising, a polymer, a colloid, a product produced by a chemical reaction, an aliquot from another sample, endproducts of a chemical reaction, and any combination thereof.

What is claimed is:

1. A device comprising:
   two or more capillary viscometers arranged in parallel, wherein the two or more capillary viscometers include a first viscometer adapted to apply a first shear rate to a sample solution containing a polymer extracted from a reactor and a second viscometer adapted to apply a second shear rate to the sample solution, the second shear rate being different from the first shear rate;
   wherein a first capillary of the first viscometer has a first radius and a second capillary of the second viscometer has a second radius that is different from the first radius;
   wherein the first viscometer and the second viscometer are operable to make continuous measurements of viscosity of the sample solution at different shear rates by measuring a pressure drop using a differential pressure transducer across the respective capillary of each of the first and second viscometers;
at least two pumps configured to introduce the sample solution through the two or more capillary viscometers during an interval of time, wherein the two or more capillary viscometers are associated with a respective pump of the at least two pumps such that the at least two pumps are configured to introduce the sample solution through the two or more capillary viscometers, the first viscometer and the second viscometer measuring the viscosity of the sample solution at a different shear rate;
a system configured to continuously extract the polymer from the reactor, to prepare the sample solution containing extracted polymer, and to deliver the sample solution to the at least two pumps;
a detector configured to monitor a polymer concentration of the sample solution;
a computer system configured to monitor and measure rheological properties during the production of the polymer under at least the first shear rate and the second shear rate simultaneously in the first viscometer and in the second viscometer;
wherein the computer system is programmed to determine a degree of non-Newtonian behavior of the polymer by determining $\eta_r$ vs. $<\dot{\gamma}>$, wherein $\eta_r$ is the reduced viscosity dependent upon the polymer concentration and $<\dot{\gamma}>$ is the average shear rate,
wherein the rheological properties comprise the reduced viscosity of the sample solution, and
wherein the interval of time includes the time for a polymerization reaction to occur, such that the viscosity measurements are made on a continuous flow of sample solution, over the interval of time.

2. The device of claim 1, further comprising an injector coupled with the at least two pumps and the two or more capillary viscometers, wherein the injector is configured to introduce a flow of the sample solution as pulses of discrete volume through the two or more capillary viscometers.

3. The device of claim 2, wherein the device is further configured for injection of discrete amounts of the continuous flow of sample solution into the concentration detector at intervals separated in time, and wherein the device is further configured for continuous flow of sample solution through the two or more capillary viscometers.

4. The device of claim 2, wherein the system comprises an ACOMP unit.

5. The device of claim 4, further comprising a reaction control unit configured to control a polymerization reaction based on measurements obtained by the computer system.

6. The device of claim 4, wherein the concentration detector comprises one selected from a group consisting of differential index of refraction detectors, ultraviolet or visible absorption spectrophotometers, infra-red absorption detectors, Raman detectors, polarimeters, conductivity sensors, evaporative light scattering detectors, and NMR.

7. The device of claim 1, wherein the at least two pumps are configured to introduce the sample solution continuously through the two or more capillary viscometers during the interval of time.

8. The device of claim 1, wherein a change of an experimental parameter of the sample solution is made between at least two of the two or more capillary viscometers, wherein the change is an increase or decrease in a polymer concentration between the at least two of the two or more capillary viscometers.

9. The device of claim 1, wherein the device is configured to increase or decrease a flow rate of the sample solution through the at least two or more capillary viscometers to increase or decrease a shear rate of the sample solution between the at least two of the two or more capillary viscometers.

10. The device of claim 9, wherein the flow rate is increased or decreased intermittently or incrementally.

11. The device of claim 9, wherein the flow rate is increased or decreased continuously.

12. The device of claim 1, wherein the system comprises:
a process controller coupled to the reactor to control polymer reactions in the reactor based on the rheological properties, and
an on-board analysis package capable of analyzing data.

13. The device of claim 1, wherein the device is configured to change the shear rate by increasing or decreasing the flow rate through the at least two or more viscometers.

14. A device comprising:
two or more capillary viscometers arranged in parallel;
at least two pumps configured to introduce a sample solution containing a polymer extracted from a reactor through the two or more capillary viscometers during an interval of time, each of the two or more capillary viscometers measuring the same sample solution at a different shear rate, wherein the two or more capillary viscometers are associated with a respective pump of the at least two pumps such that the at least two pumps are configured to introduce the sample solution through the two or more capillary viscometers, wherein a first viscometer and a second viscometer are operable to make continuous measurements of viscosity of the sample solution at different shear rates by measuring a pressure drop using a differential pressure transducer across a capillary of each of the two or more capillary viscometers;
a system configured to continuously extract the polymer from the reactor, to prepare a sample solution containing extracted polymer, and to deliver the sample solution to the at least two pumps;
a detector configured to monitor a polymer concentration of the sample solution; and
a computer system configured to monitor and measure rheological properties during the production of the polymer under at least two shear rates simultaneously in the two or more capillary viscometers,
wherein the computer system is programmed to determine a degree of non-Newtonian behavior of the polymer by determining $\eta_r$ vs. $<\dot{\gamma}>$, wherein $\eta_r$ is the reduced viscosity dependent upon the polymer concentration and $<\dot{\gamma}>$ is the average shear rate,
wherein the rheological properties comprise a viscosity of the sample solution, and wherein the interval of time includes the time for a polymer reaction to occur, such that the viscosity measurements are made on a continuous flow of sample, over an interval of time, that includes a reaction.

* * * * *